United States Patent
Ahn

(10) Patent No.: US 11,386,619 B2
(45) Date of Patent: Jul. 12, 2022

(54) METHOD AND APPARATUS FOR TRANSMITTING THREE-DIMENSIONAL OBJECTS

(71) Applicant: Samsung Electronics Co., Ltd., Suwon-si (KR)

(72) Inventor: Minsu Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/931,934

(22) Filed: Jul. 17, 2020

(65) Prior Publication Data

US 2021/0272360 A1 Sep. 2, 2021

(30) Foreign Application Priority Data

Feb. 27, 2020 (KR) .......................... 10-2020-0024323

(51) Int. Cl.
*G06T 15/20* (2011.01)
*G06T 17/20* (2006.01)
(Continued)

(52) U.S. Cl.
CPC .............. *G06T 17/205* (2013.01); *G06T 7/11* (2017.01); *G06T 7/13* (2017.01); *G06T 15/20* (2013.01);
(Continued)

(58) Field of Classification Search
None
See application file for complete search history.

(56) References Cited

U.S. PATENT DOCUMENTS 8,884,955 B1 * 11/2014 Hsu ...................... G06T 17/205
345/421
2006/0265198 A1 * 11/2006 Kanai ...................... G06T 7/12
703/2
(Continued)

FOREIGN PATENT DOCUMENTS

JP         2010-281621 A    12/2010
KR      10-0848304 B1     7/2008
(Continued)

OTHER PUBLICATIONS

Yang et al. 'A Progressive View-Dependent Technique for Interactive 3-D Mesh Transmission', IEEE Trans. on Circuits and Systems for Video Technology, 14(11):1249-1264. (Year: 2004).*
(Continued)

*Primary Examiner* — Patrick F Valdez
(74) *Attorney, Agent, or Firm* — NSIP Law

(57) ABSTRACT

A three-dimensional (3D) object transmission method and apparatus is disclosed, where the 3D object transmission method includes determining a transmission mesh level for each region of a mesh corresponding to a 3D object that is segmented into regions, identifying boundary regions and non-boundary regions from among the regions, transmitting a vertex based on a transmission mesh level of a corresponding non-boundary region for each of the non-boundary regions, and transmitting a number of vertices in a preset order based on a first transmission mesh level of at least one neighboring region forming a boundary with a corresponding boundary region for each of the boundary regions.

24 Claims, 10 Drawing Sheets

(51) Int. Cl.
  *G06T 7/11* (2017.01)
  *H04N 21/2662* (2011.01)
  *H04L 65/65* (2022.01)
  *H04N 21/81* (2011.01)
  *G06T 7/13* (2017.01)

(52) U.S. Cl.
  CPC ....... *H04L 65/608* (2013.01); *H04N 21/2662* (2013.01); *H04N 21/8146* (2013.01)

(56) References Cited

U.S. PATENT DOCUMENTS

| | | |
|---|---|---|
| 2009/0046098 A1 | 2/2009 | Barone et al. |
| 2009/0147016 A1 | 6/2009 | Barone et al. |
| 2010/0008593 A1* | 1/2010 | Gruetzmacher ........ G06T 9/001 382/244 |
| 2015/0279085 A1 | 10/2015 | Dell |
| 2015/0317818 A1 | 11/2015 | Howson et al. |
| 2016/0335799 A1 | 11/2016 | Antonini et al. |
| 2018/0330551 A1 | 11/2018 | Andersson |

FOREIGN PATENT DOCUMENTS

| | | |
|---|---|---|
| KR | 10-2011-0041977 A | 4/2011 |
| KR | 10-2012-0085134 A | 7/2012 |
| KR | 10-2016-0046399 A | 4/2016 |
| WO | WO 2016/092588 A1 | 6/2016 |

OTHER PUBLICATIONS

Chen et al, 'Progressive Visualization of Complex 3D Models Over the Internet', Trans. in GIS, 20(6):887-902. (Year: 2016).*

Pajarola et al., 'Compressed Progressive Meshes', IEEE Trans. on Visualization and Computer Graphics, 6(1), pp. 79-93. (Year: 2000).*

Alliez, Pierre et al., "Progressive Compression for Lossless Transmission of Triangle Meshes", *SIGGRAPH '01: Proceedings of the 28th annual conference on Computer graphics and interactive techniques*, Aug. 2001 (8 pages in English).

* cited by examiner

METHOD AND APPARATUS FOR TRANSMITTING THREE-DIMENSIONAL OBJECTS

CROSS-REFERENCE TO RELATED APPLICATIONS

This application claims the benefit under 35 USC § 119(a) of Korean Patent Application No. 10-2020-0024323 filed on Feb. 27, 2020, in the Korean Intellectual Property Office, the entire disclosure of which is incorporated herein by reference for all purposes.

BACKGROUND

1. Field

The following description relates to a method and apparatus for transmitting a three-dimensional (3D) object by each resolution and each segment.

2. Description of Related Art

As interest in immersive media increases, virtual reality (VR) or augmented reality (AR) image contents including, for example, a three-dimensional (3D) image are being developed. The development of communication technology has enabled the provision of 3D media contents requiring large-capacity transmission through an online platform, using which many over-the-top (OTT) service providers are able to provide a 3D media service.

The 3D media service is applied even to a streaming service such as a real-time relay service, in addition to a video on demand (VOD) service. The 3D media service may provide more immersive images to viewers by transmitting realistic sounds and views. Moreover, there is a growing user need for a 3D media service that transmits sports or events broadcasts in all directions in real time.

However, the calculation or computation needed to transmit a 3D media including a 3D object is much greater when compared to the transmission of a 2D image, and a great amount of time may needed for these calculation or computation. For 3D media streaming, in particular, a method of providing an optimal image quality in a network environment, such as a hypertext transfer protocol (HTTP) adaptive streaming (HAS) method, has not yet been defined.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a three-dimensional (3D) object transmission method, comprising determining a transmission mesh level for each region of a mesh corresponding to a 3D object that is segmented into regions, identifying boundary regions and non-boundary regions from among the regions, for each of the non-boundary regions, transmitting a vertex based on a transmission mesh level of a corresponding non-boundary region, and for each of the boundary regions, transmitting a number of vertices in a preset order based on a first transmission mesh level of at least one neighboring region forming a boundary with a corresponding boundary region.

The preset order may be determined based on proximity to the boundary.

The boundary regions may include regions having a second transmission mesh level different from the first transmission mesh level, wherein the second transmission mesh level is lower than the first transmission mesh level.

The transmitting of the number of vertices in the preset order may include determining a current transmission mesh level, and transmitting the number of vertices in the preset order based on the current transmission mesh level.

The determining of the current transmission mesh level may include determining whether the number of vertices is transmitted based on the current transmission mesh level, in response to a determination that the number of vertices is transmitted, determining whether the current transmission mesh level is identical to the first transmission mesh level, and in response to a determination that the current transmission mesh level is less than the first transmission mesh level, increasing the current transmission mesh level by one level.

The number of vertices to be transmitted based on the current transmission mesh level may be less than, by a preset number or greater, a number of vertices transmitted based on a transmission mesh level decreased by one level from the current transmission mesh level.

The preset order may be determined based on an order of vertices transmitted based on a transmission mesh level decreased by one level from the current transmission mesh level.

The determining of the transmission mesh level for each region may include determining the transmission mesh level for each region of the mesh corresponding to the 3D object based on a function that is set based on an application.

The 3D object transmission method may include obtaining a viewpoint, and determining a line dividing the 3D object based on the obtained viewpoint.

The identifying may include dividing the regions into the boundary regions and the non-boundary regions based on the line.

In another general aspect, there is provided a three-dimensional (3D) object simplification method, comprising segmenting a mesh corresponding to a 3D object into regions, extracting a boundary of each of the regions, determining a vertex removal order for each mesh level based on the boundary, and removing a vertex included in each of the regions based on the vertex removal order.

The vertex removal order may be determined based on proximity to the boundary.

The determining of the vertex removal order for each mesh level may include determining a current mesh level, and determining a vertex removal order corresponding to the current mesh level.

The determining of the current mesh level may include determining whether there is a removable vertex at the current mesh level, in response to a determination that there is no removable vertex, determining whether the current mesh level is identical to a minimum mesh level, and in response to a determination that the current mesh level is greater than the minimum mesh level, updating the current mesh level to a mesh level decreased by one level from the current mesh level.

The vertex removal order may be determined based on an order of vertices removed at a mesh level increased by one level from the current mesh level.

In another general aspect, there is provided a three-dimensional (3D) object transmission method, comprising segmenting a mesh corresponding to a 3D object into regions, extracting a boundary of each of the regions, determining a vertex removal order for each mesh level based on the boundary, determining a transmission mesh level for each region of the 3D object, dividing the regions into boundary regions and non-boundary regions, and for each of the boundary regions, transmitting a preset number of vertices in the vertex removal order based on a mesh level of at least one neighboring region forming a boundary with a corresponding boundary region.

In another general aspect, there is provided a three-dimensional (3D) object transmission apparatus, comprising a processor configured to determine a transmission mesh level for each region of a mesh corresponding to a 3D object that is segmented into regions, identify boundary regions and non-boundary regions from among the regions, for each of the non-boundary regions, transmit vertices based on a transmission mesh level of a corresponding non-boundary region, and for each of the boundary regions, transmit a preset number of vertices in a preset order based on a first transmission mesh level of at least one neighboring region forming a boundary with a corresponding boundary region.

The preset order may be determined based on proximity to the boundary.

The boundary regions may include regions having a second transmission mesh level different from the first transmission mesh level, wherein the second transmission mesh level is lower than the first transmission mesh level.

The processor may be configured to determine a current transmission mesh level, and transmit the number of vertices in the preset order based on the current transmission mesh level.

The processor may be configured to determine whether the number of vertices is transmitted based on the current transmission mesh level, in response to a determination that the number of vertices is transmitted, determine whether the current transmission mesh level is identical to the first transmission mesh level, and in response to a determination that the current transmission mesh level is less than the first transmission mesh level, increase the current transmission mesh level by one level.

The number of vertices to be transmitted based on the current transmission mesh level may be less than, by a preset number or greater, a number of vertices transmitted based on a transmission mesh level decreased by one level from the current transmission mesh level.

The preset order may be determined based on an order of vertices transmitted based on a transmission mesh level decreased by one level from the current transmission mesh level.

The processor may be configured to determine the transmission mesh level for each region of the mesh corresponding to the 3D object based on a function that is set based on an application.

The processor may be configured to obtain a viewpoint, and determine a line dividing the 3D object based on the obtained viewpoint.

The processor may be configured to divide the regions into the boundary regions and the non-boundary regions based on the line.

In another general aspect, there is provided a three-dimensional (3D) object transmission apparatus, comprising a processor configured to segment a mesh corresponding to a 3D object into regions, determine a mesh transmission level for each region of the 3D object, identify a boundary passing through the regions, and classify the regions into boundary regions and non-boundary regions based on a proximity to the boundary, and for each of the boundary regions, transmit a number of vertices in a preset order based on a mesh transmission level of a neighboring region.

The processor may be configured to determine whether a current transmission level is equal to the mesh transmission level of the neighboring region, and transmit vertices until the current transmission mesh level is equal to the mesh transmission level of the neighboring region, in response to the current transmission level not being equal to the mesh transmission level of the neighboring region.

Other features and aspects will be apparent from the following detailed description, the drawings, and the claims.

Figure 1:
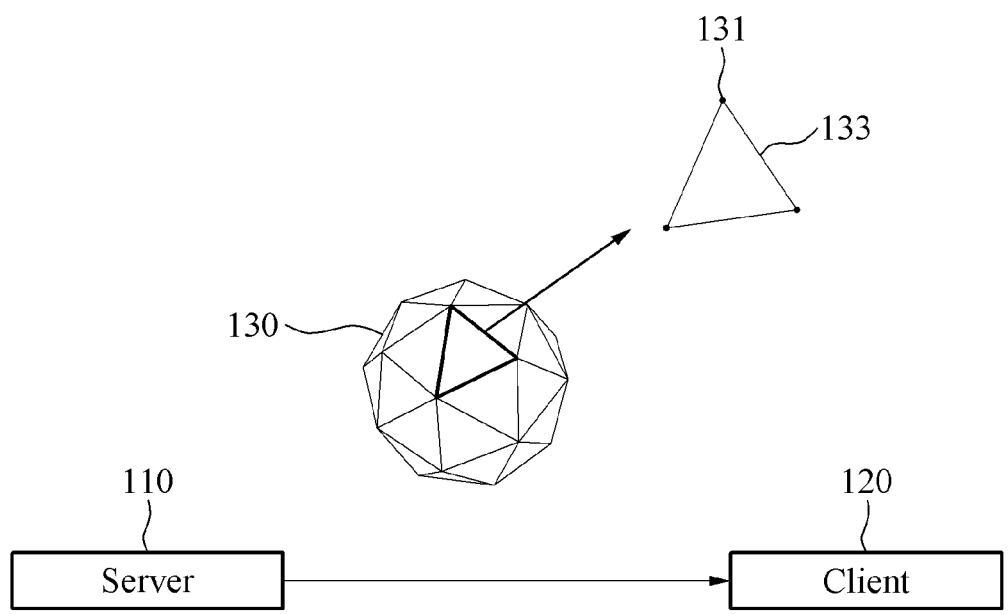
FIG. 1 is a diagram illustrating an example of a three-dimensional (3D) image transmission apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Also, in the description of example embodiments, detailed description of structures or functions that are thereby known after an understanding of the disclosure of the present application will be omitted when it is deemed that such description are redundant.

The following example embodiments may be embodied in various computing devices and/or products, such as, for example, a mobile device, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart vacuum cleaner, a smart home device, or a security device for gate control, a walking assistance device, a kiosk, a robot, an indoor autonomous robot, an outdoor delivery robot, underwater and underground exploration robots, various Internet of Things (IoT) devices, an automatic or autonomous driving system, an advanced driver assistance system (ADAS), a head-up display (HUD), and an augmented reality head-up display (AR HUD), or any other device capable of wireless communication or network communication consistent with that disclosed herein.

Hereinafter, examples will be described in detail with reference to the accompanying drawings, and like reference numerals in the drawings refer to like elements throughout.

FIG. 1 is a diagram illustrating an example of a three-dimensional (3D) image transmission apparatus.

Referring to FIG. 1, a 3D media transmission apparatus includes a server 110, and a terminal 120 which is also referred to and illustrated as a client 120.

The server 110 may transmit a 3D media to the terminal 120 through streaming. A 3D media used herein refers to an image including a 3D object and may include an augmented reality (AR) image and a virtual reality (VR) image, for example.

In an example, a 3D object may be modeled as a set of a plurality of triangles, which may be referred to herein as a mesh. In addition, a point at which two sides of a triangle included in the mesh meet may be referred to herein as a vertex. In the example of FIG. 1, in a triangle included in a mesh 130, a point at which two sides of the triangle meet is a vertex 131. The vertex 131 may include position information indicating a position in space. In the triangle, a line segment connecting vertices may be referred to herein as an edge 133.

To transmit a two-dimensional (2D) image through streaming, a hypertext transfer protocol (HTTP) adaptive streaming (HAS) method may be used for adaptive image transmission. For example, a server may segment an image by each resolution and transmit, to a terminal, a resolution required for the image transmission and a segment (also referred herein as a region) obtained by the segmenting.

In an example, the server 110 may function as a service platform that provides a 3D media to the terminal 120. The server 110 may be connected to the terminal 120 through a network (not shown). The network may include various types of networks, such as, for example, the Internet, at least one local area network, wide area network, cellular network, and mobile network, and other types of networks, or a combination thereof.

The terminal 120 may be an electronic device, such as, for example, a ultra-mobile personal computer (UMPC), a workstation, a net-book, a personal digital assistant (PDA), a portable computer, a web tablet, a wireless phone, a mobile phone, a smartphone, an e-book, a portable multimedia player (PMP), a portable game device or console, a navigation device, a black box, a digital camera, a wearable device, and an automotive. The terminal 120 may be construed as all types of a user device that enables 3D media reception and implementation in association with the server 110. In an example, the user device may perform an overall service-related operation, for example, configuration of a service screen, data input, data transmission and reception, and data storage.

Although to be described hereinafter, the server 110 may perform simplification that sequentially removes vertices of the mesh 130 corresponding to the 3D object, and segmentation that segments the mesh 130 by each mesh level. Based on a simplification order, the server 110 may transmit, to the terminal 120, the 3D media including the 3D object corresponding to a transmission mesh level requested when transmitting the 3D object. Through this, the server 110 may progressively transmit a 3D media, which is referred to herein progressive 3D media transmission, in a similar way as the HAS method for a 2D image.

However, the progressive 3D media transmission may require additional information transmission because additional information indicating a dependency between vertices may need to be transmitted. Due to the additional information transmission, latency may occur. To solve such an issue, the server 110 may segment the mesh 130 corresponding to the 3D object into a plurality of regions, and perform the simplification and the 3D media transmission independently on each of the regions obtained by the segmentation.

However, by performing the segmentation of the mesh 130 corresponding to the 3D object into the regions and the 3D media transmission for each of the regions, a boundary mismatch may occur due to a mesh level mismatch between the regions. The boundary mismatch used herein may also be referred to herein as an inconsistent boundary line. To solve such an issue, the server 110 may transmit a vertex forming a boundary of a region having a transmission mesh level lower than a transmission mesh level of a neighboring region such that the transmission mesh level of the region is identical to the transmission mesh level of the neighboring region. Here, the server 110 may not randomly transmit all the vertices of the region, but transmit a preset number of vertices close to the boundary, to solve the boundary mismatch in an economically effective way.

Hereinafter, the progressive 3D media transmission will be described in detail with reference to FIG. 2A, and the boundary mismatch will be described in detail with reference to FIG. 2B. The method of simplifying a 3D object and segmenting the 3D object by each mesh level will be described in detail with reference to FIG. 3. The method of solving the boundary mismatch by transmitting the preset number of vertices close to the boundary will be described in detail with reference to FIG. 4. The 3D object simplification will be described in detail with reference to FIGS. 5 and 6. In addition, a 3D object transmission method will be described with reference to FIGS. 7 and 8, and a 3D object transmission apparatus will be described with reference to FIG. 9.

Figure 2A:
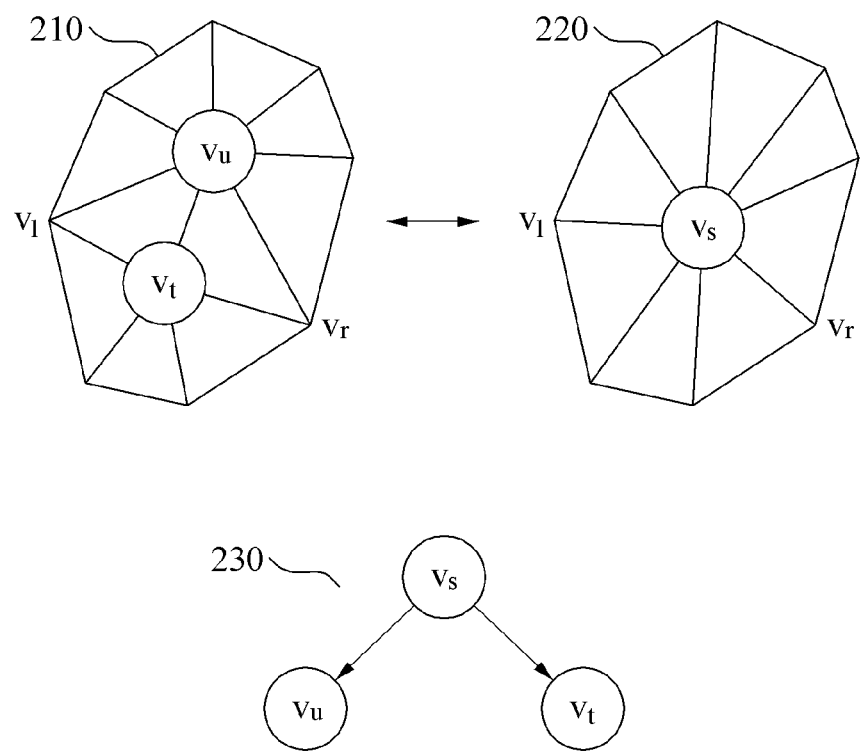
FIG. 2A is a diagram illustrating an example of a progressive 3D media transmission method.

FIG. 2A is a diagram illustrating an example of a progressive 3D media transmission method.

Referring to FIG. 2A, a second mesh 220 is obtained through simplification that removes vertices of a first mesh 210. Conversely, the first mesh 210 is obtained by adding the vertices to the second mesh 220. A mesh level of the second mesh 220 may be one level higher than a mesh level of the first mesh 210. A mesh level described herein may correspond to a 2D image resolution, and may be defined based on the number of vertices included in a mesh. In an example, the mesh level may be proportional to the number of vertices included in the mesh.

To represent a 3D object by a plurality of mesh levels, information of a previous lower mesh level may be needed, not like in a 2D image. That is, by adding an additional vertex to vertices included in the 3D object corresponding to a lower mesh level, it is possible to restore a 3D object corresponding to a mesh level increased by one level. Thus, there is a dependency between the previous mesh level and the mesh level higher by one level than the previous mesh level, and thus it may not be possible to restore vertices in a random order.

Thus, based on such a dependency, a vertex hierarchy may be generated, and an order of vertices to be transmitted first may be determined based on the vertex hierarchy. For example, when obtaining the first mesh 210 by adding the vertices to the second mesh 220, the vertices may not be restored in a random order, but the vertices may need to be transmitted based on an order determined based on a hierarchical structure 230 of the vertices. In this example, additional information indicating a dependency among the vertices may need to be transmitted, and thus additional information transmission may be needed. Because of which, latency may occur.

Figure 2B:
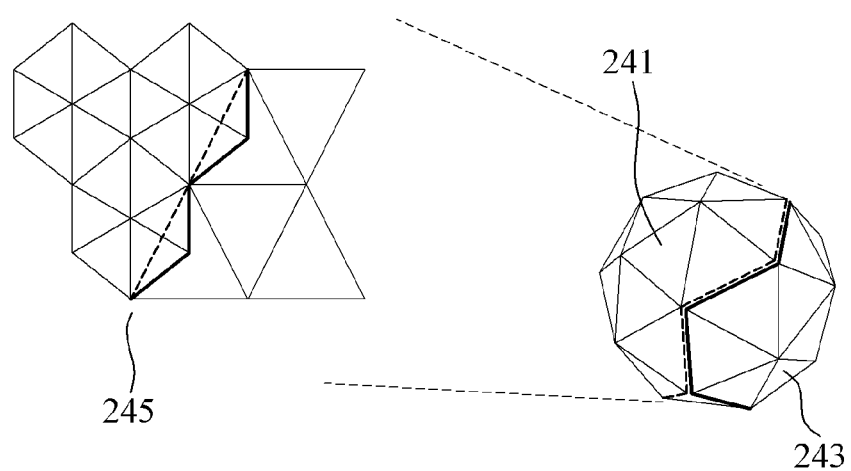
FIG. 2B is a diagram illustrating an example of an image segmentation method and a boundary mismatch.

FIG. 2B is a diagram illustrating an example of an image segmentation method and a boundary mismatch.

Due to additional information transmission in a hierarchical vertex structure, latency may occur. To solve such a latency, an image segmentation method may be used. The image segmentation method may segment a mesh corresponding to a 3D object into a plurality of regions, and perform simplification and image transmission independently on each of the regions.

Referring to FIG. 2B, a mesh corresponding to a 3D object is segmented into a first region 241 and a second region 243, and simplification and vertex transmission may be performed independently on each of the first region 241 and the second region 243. The image segmentation method may require a less amount of information compared to a hierarchical vertex structure-based method, and enable parallel processing for each region. Thus, the image segmentation method may enable rapid simplification and vertex transmission. However, when using the image segmentation method, there may be a boundary mismatch or an inconsistent boundary line due to a mesh level mismatch between segmented regions.

For example, as illustrated, on the first region 241, the vertex transmission may be performed based on a mesh level n. In addition, on the second region 243, the vertex transmission may be performed based on a mesh level n−1. Referring to reference numeral 245, the mesh level of the first region 241 and the mesh level of the second region 243 are different from each other, and thus boundaries formed by the respective regions may differ from each other. That is, the image segmentation method may perform the simplification and the vertex transmission independently on each segmented region, and an inconsistent boundary line as illustrated by reference numeral 245 may occur when a mesh level of a two neighboring region are different from each other.

Such an inconsistent boundary line may occur due to a difference in mesh level between neighboring regions. In an example, a 3D media transmission apparatus described herein may transmit a vertex forming a boundary of a region having a mesh level lower than a mesh level of a neighboring region such that a mesh level of a boundary region of the region is identical to the mesh level of the neighboring region, thereby solving an issue of the inconsistent boundary line. A boundary region described herein may indicate a region around a boundary. In this example, the 3D media transmission apparatus may transmit only a preset number of vertices close to the boundary without randomly transmitting all vertices of the region, and thus solve the issue of the inconsistent boundary line in an economically effective way.

Figure 3:
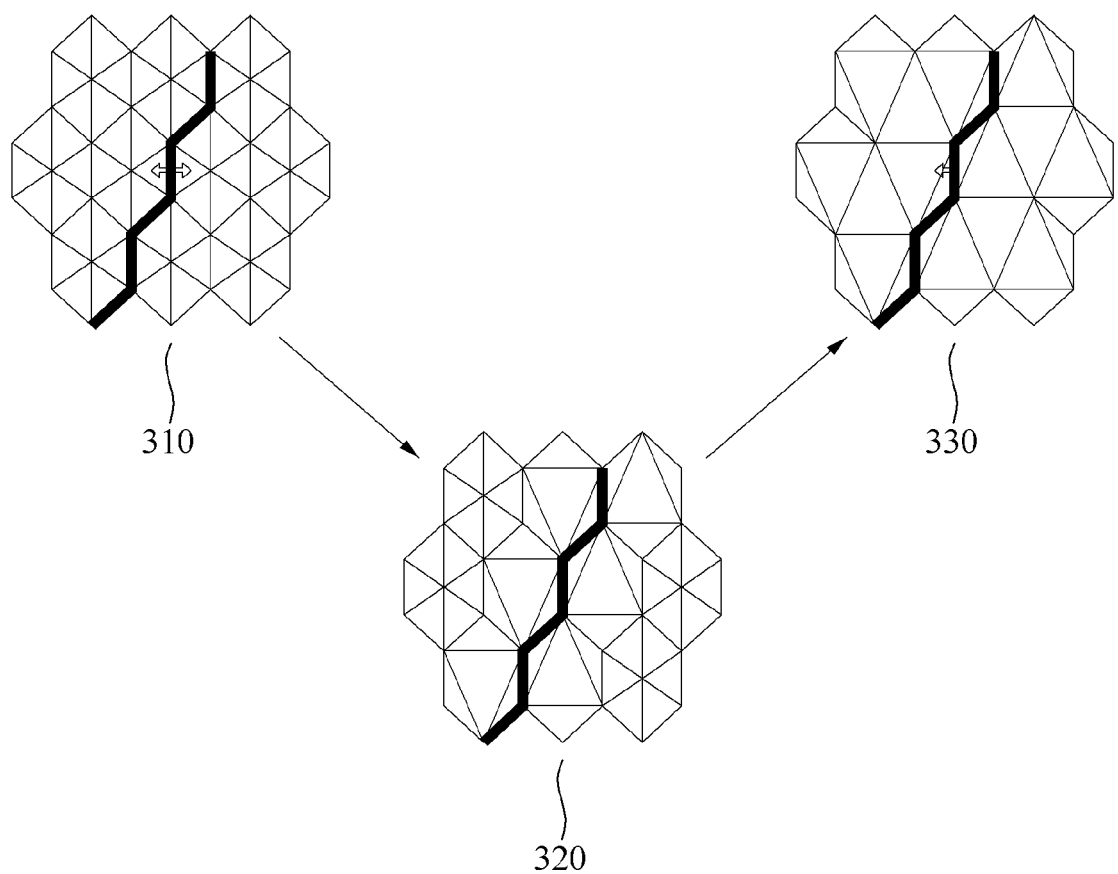
FIG. 3 is a diagram illustrating an example of segmenting a 3D object by each mesh level by performing simplification on the 3D object.

FIG. 3 is a diagram illustrating an example of segmenting a 3D object by each mesh level by performing simplification on the 3D object.

Referring to FIG. 3, a 3D media transmission apparatus may sequentially remove vertices of a mesh corresponding to a 3D object, segmenting the 3D object by each mesh level, and transmitting vertices based on a vertex removal order.

In an example, as illustrated, the 3D media transmission apparatus may determine a vertex removal order based on a boundary, and remove vertices based on the determined vertex removal order. For example, the 3D media transmission apparatus may simplify a mesh 310 having a mesh level n to be a mesh 330 having a mesh level n−1 by removing vertices.

In this example, the 3D media transmission apparatus may first remove vertices close to a boundary. For example, referring to reference numeral 320, the 3D media transmission apparatus may first remove a vertices close to the boundary from the mesh 310 having the mesh level n.

As a simplification method that removes vertices, various types of simplification including, for example, a vertex valence-based simplification method based on the number of neighboring vertices and a gate-based mesh surface conquest method, may be adopted.

Figure 4:
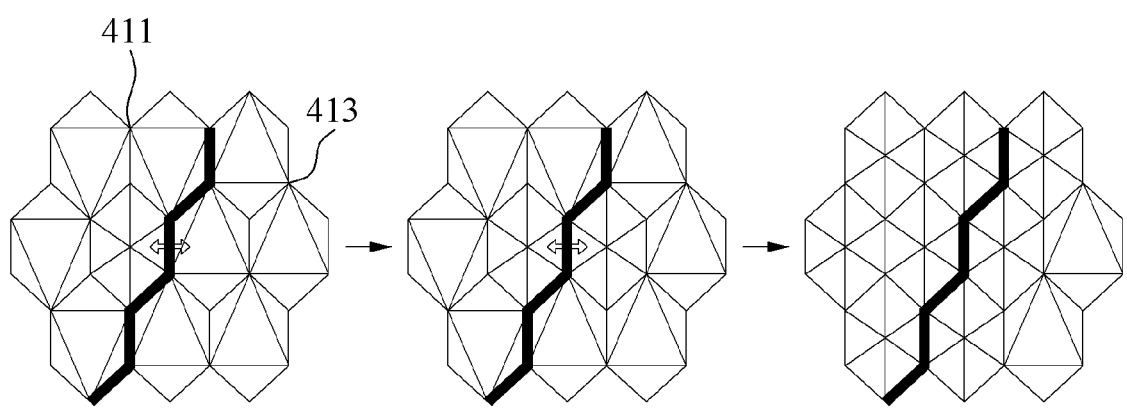
FIG. 4 is a diagram illustrating an example of transmitting only a preset number of vertices close to a boundary to solve an issue of a boundary mismatch.

FIG. 4 is a diagram illustrating an example of transmitting only a preset number of vertices close to a boundary to solve an issue of a boundary mismatch.

Referring to FIG. 4, when transmitting a 3D object, a 3D media transmission apparatus may determine a transmission mesh level for each region of a mesh corresponding to the 3D object. For example, as illustrated, the 3D media transmission apparatus may determine a transmission mesh level of a first region 411 to be n, and a transmission mesh level of a second region 413 to be n−1.

In this example, since the transmission mesh level of the first region 411 and the transmission mesh level of the second region 413 are different from each other, an inconsistent boundary line may occur between the first region 411 and the second region 413. To solve such an issue of the inconsistent boundary line, the 3D media transmission apparatus may transmit vertices of a boundary region such that a mesh level of the boundary region of the second region 413 having the lower transmission mesh level is identical to the transmission mesh level of the first region 411. That is, the 3D media transmission apparatus may solve the issue of the inconsistent boundary line by transmitting the vertices such that a mesh level of the boundary region of the second region 413 is n and a mesh level of a remaining region of the second region 413 is n−1.

Figure 5:
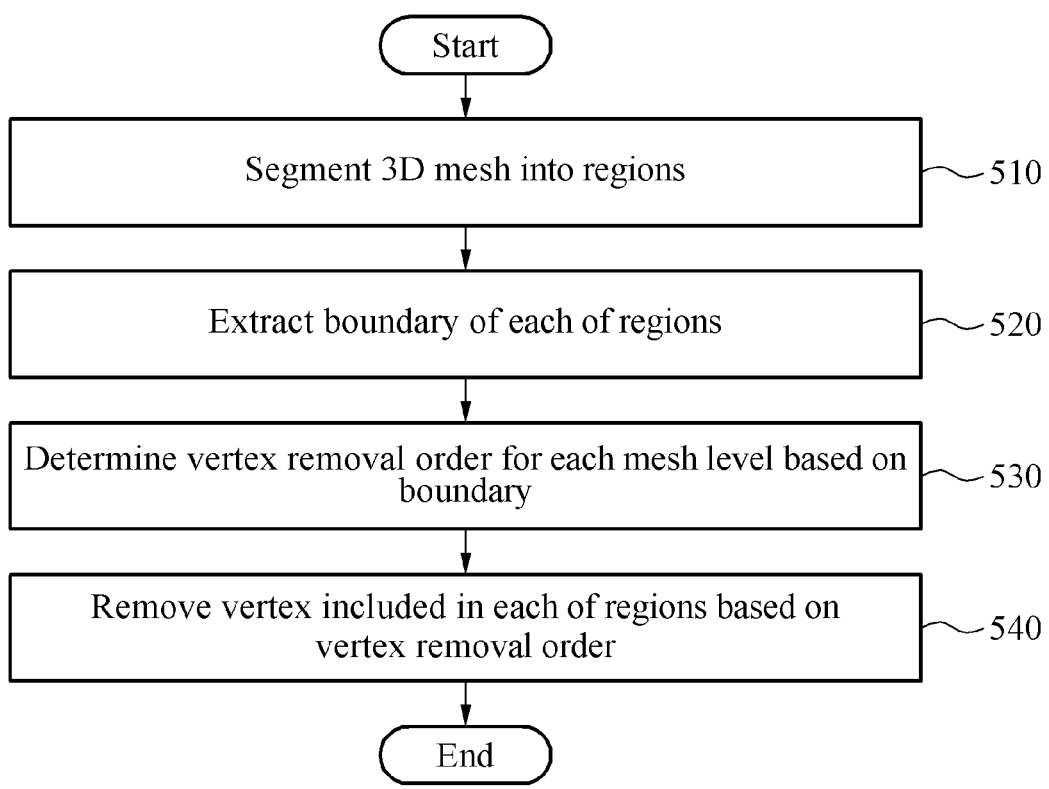
FIG. 5 is a diagram illustrating an example of a 3D object simplification method.

FIG. 5 is a diagram illustrating an example of a 3D object simplification method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions.

Operations 510 through 540 to be described hereinafter with reference to FIG. 5 may be performed by the 3D media transmission apparatus described above with reference to FIGS. 1 through 4. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the 3D media transmission apparatus segments a 3D mesh into a plurality of regions.

In operation 520, the 3D media transmission apparatus extracts a boundary of each of the regions.

In operation 530, the 3D media transmission apparatus determines a vertex removal order for each mesh level based on the boundary. In an example, the vertex removal order may be determined based on closeness to the boundary. The 3D media transmission apparatus may determine a current mesh level, and determine a vertex removal order corresponding to the determined current mesh level. The 3D media transmission apparatus may determine whether there is a removable vertex at the current mesh level, determine whether the current mesh level is identical to a minimum mesh level when it is determined that there is no removable vertex, and update the current mesh level to a mesh level decreased by one level from the current mesh level when it is determined that the current mesh level is greater than the minimum mesh level. The vertex removal order may be determined based on an order of vertices removed at a mesh level which is one level above from the current mesh level.

In operation 540, the 3D media transmission apparatus removes vertices included in each of the regions based on the vertex removal order.

Figure 6:
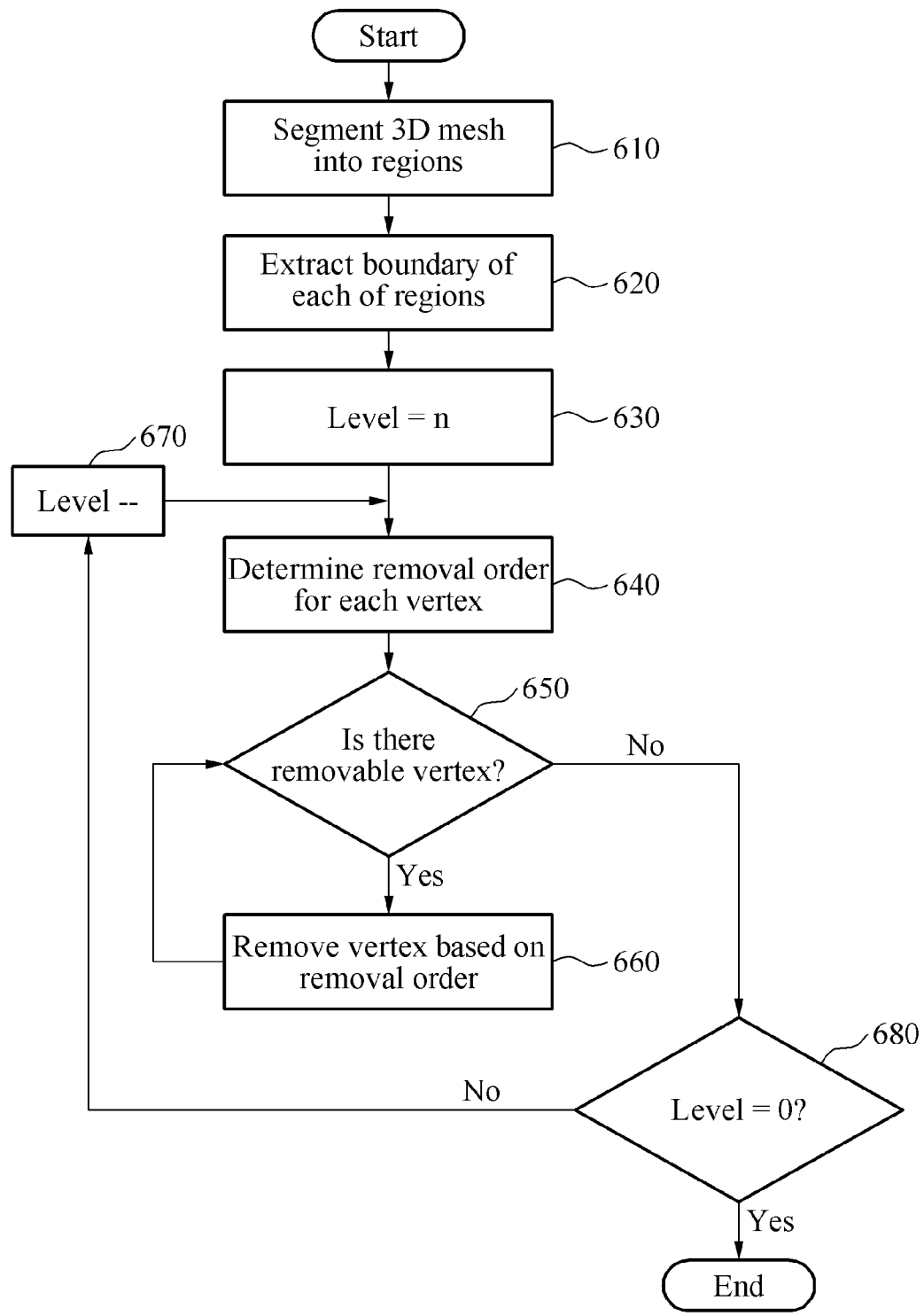
FIG. 6 is a diagram illustrating an example of a 3D object simplification method for each mesh level.

FIG. 6 is a diagram illustrating an example of a 3D object simplification method for each mesh level. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions.

Operations 610 through 680 to be described hereinafter with reference to FIG. 6 may be performed by the 3D media transmission apparatus described above with reference to FIGS. 1 through 5. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, the 3D media transmission apparatus segments a 3D mesh into a plurality of regions. In operation 620, the 3D media transmission apparatus extracts a boundary of each of the regions.

In operation 630, the 3D media transmission apparatus determines a current mesh level to be n.

In operations 640 through 680, the 3D media transmission apparatus performs 3D object simplification for each mesh level. In operation 640, the 3D media transmission apparatus determines a removal order for each vertex.

In operation 650, the 3D media transmission apparatus determines whether there is a removable vertex. In operation 660, when there is a removable vertex, the 3D media transmission apparatus removes the vertex based on the removal order. However, in operation 680, when there is no removable vertex, the 3D media transmission apparatus determines whether the current mesh level is 0 or not. In operation 670, when the current mesh level is not 0, the 3D media transmission apparatus updates the current mesh level to a mesh level decreased by one level from the current mesh level. When the current mesh level is 0, the 3D media transmission apparatus may terminate the simplification method.

Figure 7:
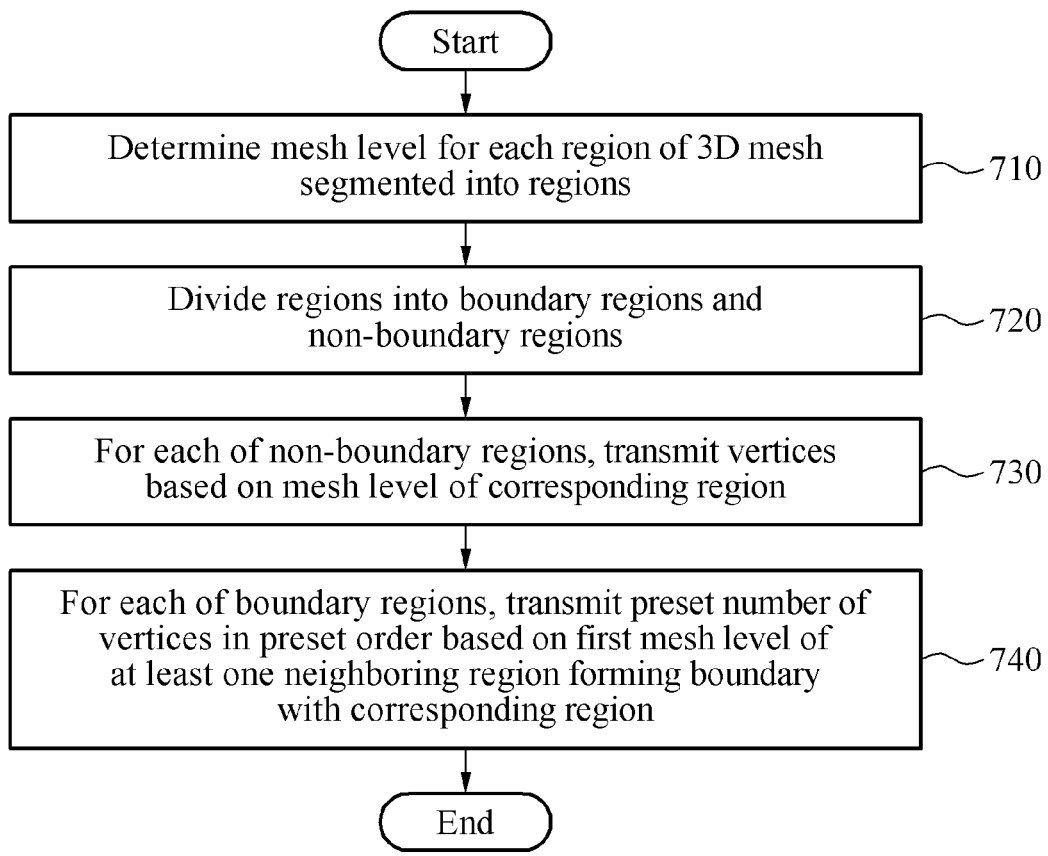
FIG. 7 is a diagram illustrating an example of a 3D object transmission method.

FIG. 7 is a diagram illustrating an example of a 3D object transmission method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions.

Operations 710 through 740 to be described hereinafter with reference to FIG. 7 may be performed by the 3D media transmission apparatus described above with reference to FIGS. 1 through 6. In addition to the description of FIG. 8 below, the descriptions of FIGS. 1-7 are also applicable to FIG. 8, and are incorporated herein by reference. Thus, the above description may not be repeated here.

Referring to FIG. 7, in operation 710, the 3D media transmission apparatus determines a transmission mesh level for each region of a mesh corresponding to a 3D object that is segmented into a plurality of regions. A transmission mesh level described herein may indicate a final mesh level of a mesh to be transmitted. The 3D media transmission apparatus may determine a mesh level of the mesh corresponding to the 3D object based on a function that is set for an application.

In operation 720, the 3D media transmission apparatus divides the regions into boundary regions and non-boundary regions. In an example, the boundary regions may be regions having a transmission mesh level that is different from a transmission mesh level of neighboring or adjacent regions or regions having the transmission level lower than the transmission mesh level of the neighboring regions. The non-boundary regions may include remaining regions, excluding the boundary regions from the regions. For example, the non-boundary regions may include regions having a same transmission mesh level as the transmission mesh level of all the neighboring regions, and regions having a transmission mesh level higher than that of the neighboring regions.

In operation 730, for each of the non-boundary regions, the 3D media transmission apparatus transmits vertices based on a transmission mesh level of the corresponding region.

In operation 740, for each of the boundary regions, the 3D media transmission apparatus transmits a preset number of vertices in a preset order based on a first transmission mesh level of at least one neighboring region forming a boundary with a corresponding region. In an example, the preset order may be determined based on closeness to the boundary. The 3D media transmission apparatus may determine a current transmission mesh level, and transmit the preset number of vertices in the preset order based on the current transmission mesh level.

In an example, the 3D media transmission apparatus determines whether the preset number of vertices are transmitted based on the current transmission mesh level. When the preset number of vertices are transmitted, the 3D media transmission apparatus may determine whether the current transmission mesh level is same as the first transmission mesh level. When the current transmission mesh level is less than the first transmission mesh level, the 3D media transmission apparatus may update the current transmission mesh level to a transmission mesh level increased by one level from the current transmission mesh level. The preset number of vertices to be transmitted based on the current transmission mesh level may be less than, by a certain number or more, the number of vertices transmitted based on a transmission mesh level decreased by one level from the current transmission mesh level.

For example, when a transmission mesh level of a first region is 1 and a transmission mesh level of a second region near the first region is 3, there may be an inconsistent boundary line between the first region and the second region. In this example, to solve such an issue, the 3D media transmission apparatus may transmit all vertices corresponding to mesh level 1 of the first region, transmit a preset number of vertices corresponding to mesh level 2 in an order starting from a vertex closest to a boundary, and transmit a number of vertices corresponding to mesh level 3 in an order starting from a vertex closest to a boundary. The 3D media transmission apparatus may transmit the vertices corresponding to mesh level 3 based on the order of the vertices transmitted based on mesh level 2.

Although not illustrated, the 3D media transmission apparatus may obtain a view (or a viewpoint) of a user on a 3D object, and determine a dividing line of the 3D object based on the obtained view. Based on the view of the user, the 3D object may be divided into a portion that is viewed by the user and a portion that is not viewed by the user. In an example, the dividing line may indicate a boundary that divides the two portions. The 3D media transmission apparatus may divide a plurality of regions into boundary regions and non-boundary regions based on the division line. For example, the 3D media transmission apparatus may determine regions including the dividing line to be the boundary regions, and regions not including the dividing line to be the non-boundary regions. The regions including the dividing line may have a transmission mesh level different from a transmission mesh level of neighboring regions, and thus be divided as the boundary regions.

Figure 8:
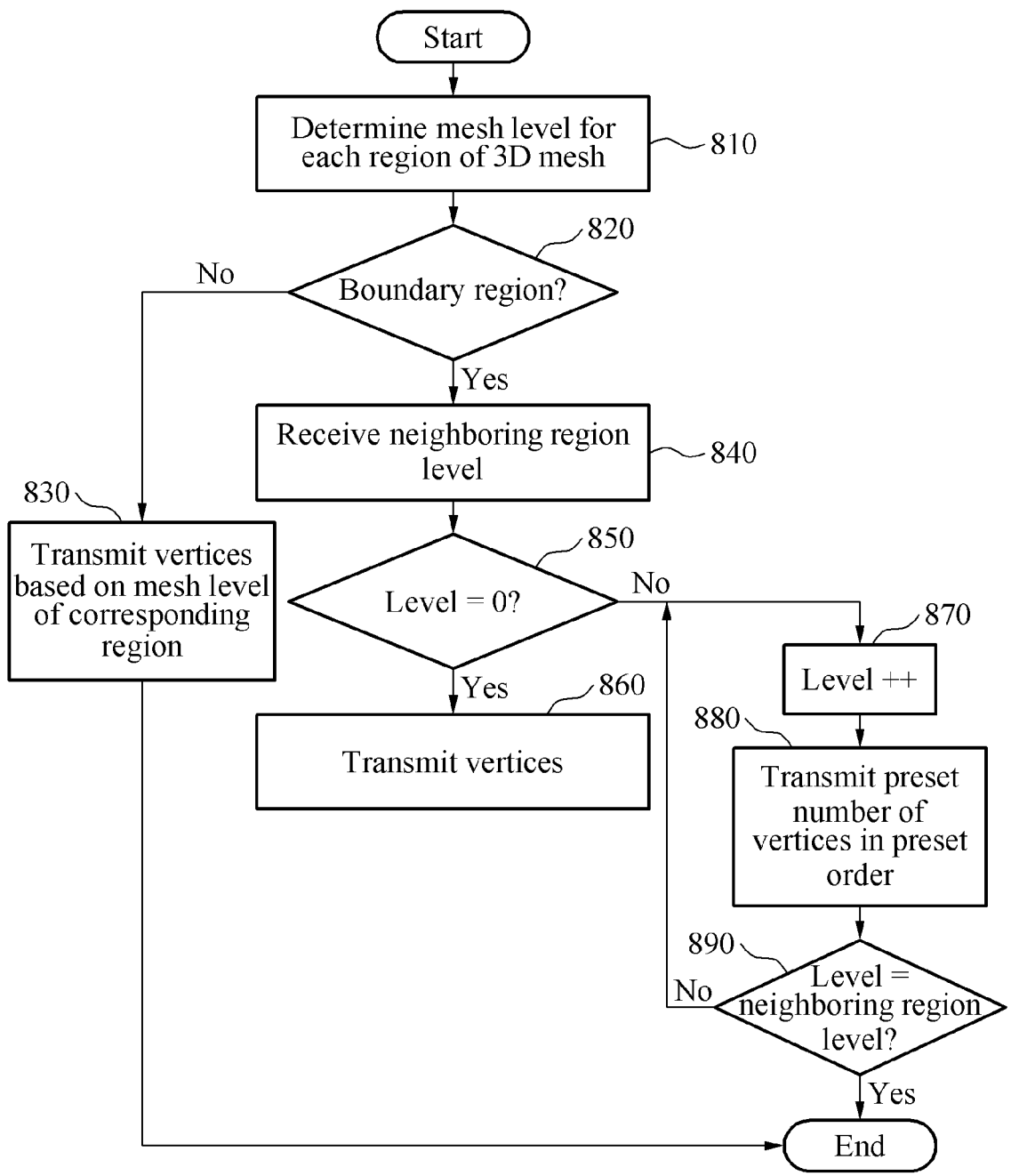
FIG. 8 is a diagram illustrating an example of a 3D object transmission method for each mesh level.

FIG. 8 is a diagram illustrating an example of a 3D object transmission method for each mesh level. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions.

Operations 810 through 890 to be described hereinafter with reference to FIG. 8 may be performed by the 3D media transmission apparatus described above with reference to FIGS. 1 through 7. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, a 3D media transmission apparatus determines a mesh level for each region of a 3D mesh. In operation 820, the 3D media transmission apparatus divides a plurality of regions into boundary regions and non-boundary regions.

In operation 830, in a case of the non-boundary regions, the 3D media transmission apparatus transmits vertices based on a mesh level of the non-boundary region.

In operation 840, in a case of the boundary regions, the 3D media transmission apparatus receives a transmission mesh level of a neighboring region. In operation 850, the 3D media transmission apparatus determines whether a current transmission mesh level is 0. In operation 860, when the current transmission mesh level is 0, the 3D media transmission apparatus transmits vertices corresponding to the current transmission mesh level of 0.

In operation 870, when the 3D media transmission apparatus transmits all the vertices corresponding to the current transmission mesh level of 0, the 3D media transmission apparatus increases the current transmission mesh level by one level.

In operation 880, the 3D media transmission apparatus transmits a preset number of vertices in a preset order.

In operation 890, the 3D media transmission apparatus determines whether the current transmission mesh level is the transmission mesh level of the neighboring region, and transmit vertices until the current transmission mesh level becomes the transmission mesh level of the neighboring region.

Figure 9:
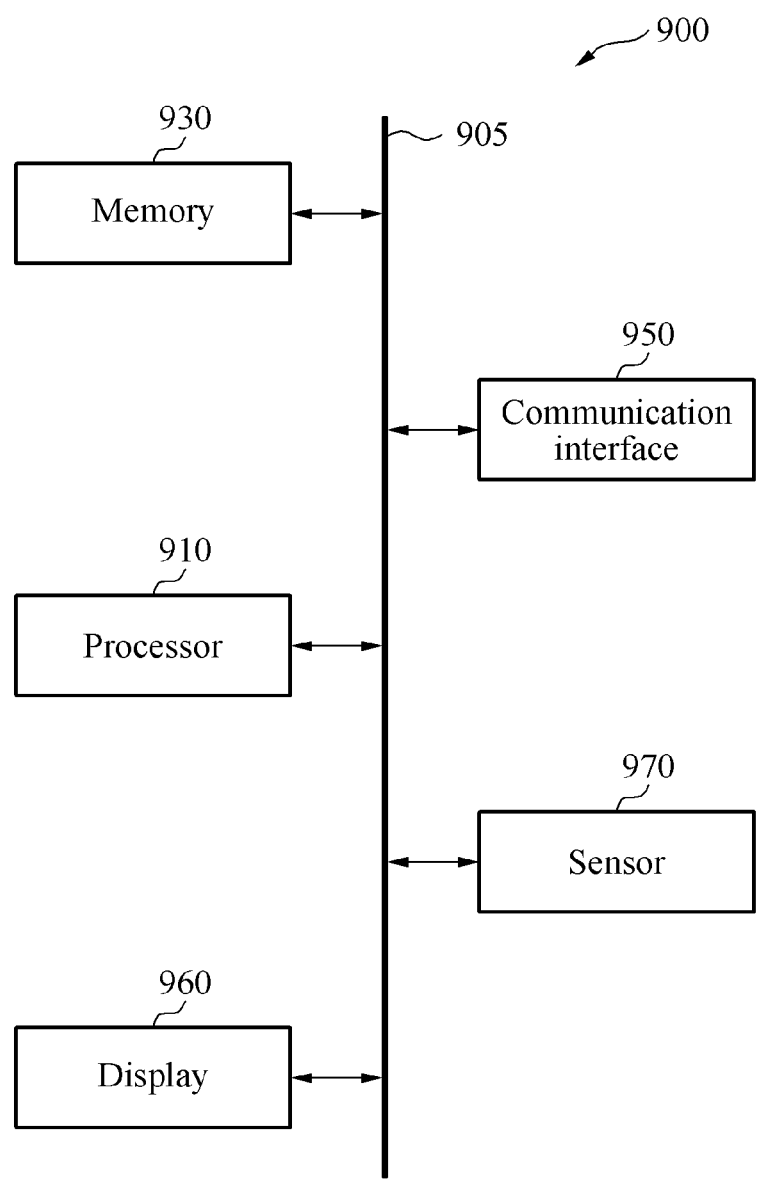
FIG. 9 is a diagram illustrating an example of a 3D object transmission apparatus.

FIG. 9 is a diagram illustrating an example of a 3D object transmission apparatus.

Referring to FIG. 9, a 3D object transmission apparatus 900 includes a processor 910. The 3D object transmission apparatus 900 further includes a memory 930, a communication interface 950, output 960, and a sensor 970. The processor 910, the memory 930, the communication interface 950, the output 960, and the sensor 970 may communicate with one another through a communication bus 905.

In an example, the processor 910 may determine a transmission mesh level for each region of a mesh corresponding to a 3D object that is segmented into a plurality of regions, and divide the regions into boundary regions and non-boundary regions. For each of the non-boundary regions, the processor 910 may transmit vertices based on a transmission mesh level of a corresponding region. For each of the boundary regions, the processor 910 may transmit a preset number of vertices in a preset order based on a first transmission mesh level of at least one neighboring region forming a boundary with a corresponding region.

In addition, the processor 910 may perform the at least one method described with reference to FIGS. 1 through 8 or an algorithm corresponding to the at least one method. The processor 910 may be a data processing device implemented by hardware including a circuit having a physical structure to perform desired operations. For example, the desired operations may include instructions or codes included in a program. For example, the hardware-implemented prediction apparatus may include a microprocessor, a central processing unit (CPU), a processor core, a multi-core processor, a multiprocessor, an application-specific integrated circuit (ASIC), and a field programmable gate array (FPGA), a graphics processor unit (GPU), or any other type of multi- or single-processor configuration. Further details regarding the processor 910 is provided below.

The memory 930 may store the mesh. The memory 930 may be a volatile memory or a nonvolatile memory. Further details regarding the memory 930 is provided below.

The sensor 970 may be provided as a plurality of sensors and include, for example, a camera sensor configured to collect image information. The sensors may collect various sets of image information.

In another example, the processor 910 may determine a current transmission mesh level, and transmit a number of vertices in a preset order based on the determined current transmission mesh level.

The processor 910 may determine whether the preset number of vertices is transmitted based on the current transmission mesh level. When the preset number of vertices is transmitted, the processor 910 may determine whether the current transmission mesh level is identical to a first mesh level. When the current transmission mesh level is less than the first mesh level, the processor 910 may update the current transmission mesh level to a mesh level increased by one level from the current transmission mesh level.

In addition, the processor 910 may perform one or more, or all, of the operations or methods described above with reference to FIGS. 1 through 8, or an algorithm corresponding to the one or more, or all, of the operations or methods.

The processor 910 may execute a program and control the 3D object transmission apparatus 900. A code of the program to be executed by the processor 910 may be stored in the memory 930. The 3D object transmission apparatus 900 may be connected to an external device, for example, a PC and a network, through an input and output device (not shown), and exchange data with the external device.

The 3D object transmission apparatus 900 may be provided or embedded in various computing devices and/or products such as those listed above.

The display 960 displays the object of interest of the user predicted by the processor 910. The display 960 is a physical structure that includes one or more hardware components that provide the ability to render a user interface, render a display, and/or receive user input. The display 960 is not limited to the example described above, and any other displays, such as, for example, computer monitor and eye glass display (EGD) that are operatively connected to the 3D object transmission apparatus 900 may be used without departing from the spirit and scope of the illustrative examples described. In an example, the display 960 is a physical structure that includes one or more hardware components that provide the ability to render a user interface, render a display, and/or receive user input.

The 3D media transmission system, the 3D object transmission apparatus, and other apparatuses, units, modules, devices, and other components described herein with respect to FIGS. 1 and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the three-dimensional (3D) object transmission method. In another example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) object transmission method, comprising:
    determining a transmission mesh level for each region of a mesh corresponding to a 3D object that is segmented into regions;
    identifying boundary regions and non-boundary regions from among the regions;
    for each of the non-boundary regions, transmitting a vertex based on a transmission mesh level of a corresponding non-boundary region; and
    for each of the boundary regions, transmitting a number of vertices in a preset order based on a first transmission mesh level of at least one neighboring region forming a boundary with a corresponding boundary region,
    wherein the transmitting of the number of vertices in the preset order comprises
    determining a current transmission mesh level, and
    transmitting the number of vertices in the preset order based on an order of vertices transmitted based on a transmission mesh level decreased by one level from the current transmission mesh level.

2. The 3D object transmission method of claim 1, wherein the preset order is determined based on proximity to the boundary.

3. The 3D object transmission method of claim 1, wherein the boundary regions comprise regions having a second transmission mesh level different from the first transmission mesh level, wherein the second transmission mesh level is lower than the first transmission mesh level.

4. The 3D object transmission method of claim 1, wherein the determining of the current transmission mesh level comprises:
 determining whether the number of vertices is transmitted based on the current transmission mesh level;
 in response to a determination that the number of vertices is transmitted, determining whether the current transmission mesh level is identical to the first transmission mesh level; and
 in response to a determination that the current transmission mesh level is less than the first transmission mesh level, increasing the current transmission mesh level by one level.

5. The 3D object transmission method of claim 1, wherein the number of vertices to be transmitted based on the current transmission mesh level is less than, by a preset number or greater, a number of vertices transmitted based on a transmission mesh level decreased by one level from the current transmission mesh level.

6. The 3D object transmission method of claim 1, wherein the determining of the transmission mesh level for each region comprises:
 determining the transmission mesh level for each region of the mesh corresponding to the 3D object based on a function that is set based on an application.

7. The 3D object transmission method of claim 1, further comprising:
 obtaining a viewpoint; and
 determining a line dividing the 3D object based on the obtained viewpoint.

8. The 3D object transmission method of claim 7, wherein the identifying comprises:
 dividing the regions into the boundary regions and the non-boundary regions based on the line.

9. A non-transitory computer-readable storage medium storing instructions that, when executed by a processor, cause the processor to perform the 3D object transmission method of claim 1.

10. A three-dimensional (3D) object simplification method, comprising:
 segmenting a mesh corresponding to a 3D object into regions;
 extracting a boundary of each of the regions;
 determining a vertex removal order for each mesh level based on the boundary; and
 removing a vertex included in each of the regions based on the vertex removal order,
 wherein the determining of the vertex removal order for the each mesh level comprises
  determining a current mesh level, and
  determining a vertex removal order corresponding to the current mesh level based on an order of vertices removed at a mesh level increased by one level from the current mesh level.

11. The 3D object simplification method of claim 10, wherein the vertex removal order is determined based on proximity to the boundary.

12. The 3D object simplification method of claim 10, wherein the determining of the current mesh level comprises:
 determining whether there is a removable vertex at the current mesh level;
 in response to a determination that there is no removable vertex, determining whether the current mesh level is identical to a minimum mesh level; and
 in response to a determination that the current mesh level is greater than the minimum mesh level, updating the current mesh level to a mesh level decreased by one level from the current mesh level.

13. A three-dimensional (3D) object transmission method, comprising:
 segmenting a mesh corresponding to a 3D object into regions;
 extracting a boundary of each of the regions;
 determining a vertex removal order for each mesh level based on the boundary;
 determining a transmission mesh level for each region of the 3D object;
 dividing the regions into boundary regions and non-boundary regions; and
 for each of the boundary regions, transmitting a preset number of vertices in the vertex removal order based on a mesh level of at least one neighboring region forming a boundary with a corresponding boundary region,
 wherein the transmitting of the preset number of comprises
  determining a current transmission mesh level, and
  transmitting the number of vertices in the preset order based on an order of vertices transmitted based on a transmission mesh level decreased by one level from the current transmission mesh level.

14. A non-transitory computer-readable storage medium storing instructions that, when executed by a processor, cause the processor to perform the 3D object transmission method of claim 13.

15. A three-dimensional (3D) object transmission apparatus, comprising:
 a processor configured to:
 determine a transmission mesh level for each region of a mesh corresponding to a 3D object that is segmented into regions;
 identify boundary regions and non-boundary regions from among the regions;
 for each of the non-boundary regions, transmit vertices based on a transmission mesh level of a corresponding non-boundary region; and
 for each of the boundary regions, transmit a preset number of vertices in a preset order based on a first transmission mesh level of at least one neighboring region forming a boundary with a corresponding boundary region,
 wherein the processor is further configured to:
  determine a current transmission mesh level, and
  transmitting the number of vertices in the preset order based on an order of vertices transmitted based on a transmission mesh level decreased by one level from the current transmission mesh level.

16. The 3D object transmission apparatus of claim 15, wherein the preset order is determined based on proximity to the boundary.

17. The 3D object transmission apparatus of claim 15, wherein the boundary regions comprise regions having a second transmission mesh level different from the first transmission mesh level, wherein the second transmission mesh level is lower than the first transmission mesh level.

18. The 3D object transmission apparatus of claim 17, wherein the processor is further configured to:
 obtain a viewpoint; and
 determine a line dividing the 3D object based on the obtained viewpoint.

19. The 3D object transmission apparatus of claim 18, wherein the processor is further configured to:
 divide the regions into the boundary regions and the non-boundary regions based on the line.

20. The 3D object transmission apparatus of claim 15, wherein the processor is further configured to:
  determine whether the number of vertices is transmitted based on the current transmission mesh level;
  in response to a determination that the number of vertices is transmitted, determine whether the current transmission mesh level is identical to the first transmission mesh level; and
  in response to a determination that the current transmission mesh level is less than the first transmission mesh level, increase the current transmission mesh level by one level.

21. The 3D object transmission apparatus of claim 15, wherein the number of vertices to be transmitted based on the current transmission mesh level is less than, by a preset number or greater, a number of vertices transmitted based on a transmission mesh level decreased by one level from the current transmission mesh level.

22. The 3D object transmission apparatus of claim 15, wherein the processor is further configured to:
  determine the transmission mesh level for each region of the mesh corresponding to the 3D object based on a function that is set based on an application.

23. A three-dimensional (3D) object transmission apparatus, comprising:
  a processor configured to:
    segment a mesh corresponding to a 3D object into regions;
    determine a mesh transmission level for each region of the 3D object;
    identify a boundary passing through the regions, and classify the regions into boundary regions and non-boundary regions based on a proximity to the boundary; and
    for each of the boundary regions, transmit a number of vertices in a preset order based on a mesh transmission level of a neighboring region
  wherein the processor is further configured to:
    determine a current transmission mesh level, and
    transmit the number of vertices in the preset order based on the current transmission mesh level being less than, by a preset number or greater, a number of vertices transmitted based on a transmission mesh level decreased by one level from the current transmission mesh level.

24. The 3D object transmission apparatus of claim 23, wherein the processor is further configured to:
  determine whether a current transmission level is equal to the mesh transmission level of the neighboring region, and
  transmit vertices until the current transmission mesh level is equal to the mesh transmission level of the neighboring region, in response to the current transmission level not being equal to the mesh transmission level of the neighboring region.

* * * * *